United States Patent
Lee

(10) Patent No.: US 7,976,981 B2
(45) Date of Patent: *Jul. 12, 2011

(54) POUCH-TYPE LITHIUM SECONDARY BATTERY AND FABRICATING METHOD THEREOF

(75) Inventor: Hyungbok Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 397 days.

This patent is subject to a terminal disclaimer.

(21) Appl. No.: 11/540,855

(22) Filed: Sep. 28, 2006

(65) Prior Publication Data

US 2007/0072071 A1 Mar. 29, 2007

(30) Foreign Application Priority Data

Sep. 28, 2005 (KR) ......................... 10-2005-0090780

(51) Int. Cl.
*H01M 2/04* (2006.01)
*H01M 2/02* (2006.01)
*H01M 2/08* (2006.01)
*H01M 4/82* (2006.01)

(52) U.S. Cl. ........ 429/176; 429/177; 429/162; 429/185; 29/623.1; 29/623.2; 29/623.4

(58) Field of Classification Search .............. 429/53–55, 429/127–129, 131, 133, 135–136, 138–139, 429/142, 162–163, 175–178, 180–182, 184–186; 29/623.1–623.5; 428/500, 515–523
See application file for complete search history.

(56) References Cited

U.S. PATENT DOCUMENTS

| 5,591,540 A | | 1/1997 | Louie et al. | |
|---|---|---|---|---|
| 5,916,704 A | * | 6/1999 | Lewin et al. | 429/54 |
| 6,048,638 A | * | 4/2000 | Pendalwar | 429/127 |

(Continued)

FOREIGN PATENT DOCUMENTS

CN 1298212 A 6/2001

(Continued)

OTHER PUBLICATIONS

Dictionary.com, LLC, (2009; http://dictionary.reference.com/browse/around).*

(Continued)

*Primary Examiner* — Dah-Wei D Yuan
*Assistant Examiner* — Claire L Rademaker
(74) *Attorney, Agent, or Firm* — Christie, Parker & Hale, LLP

(57) ABSTRACT

A pouch-type lithium secondary battery in which an additional packing case is not used is provided. The pouch material is used to perform packing processes, thereby simplifying packing processes and methods of manufacturing. The pouch-type lithium secondary battery includes an electrode assembly and a pouch material. The electrode assembly includes a first electrode plate to which a first electrode tab is attached, a second electrode plate to which a second electrode tab is attached, and a separator between the first and second electrode plates. The pouch material has first, second, and third surfaces. The first and second surfaces are folded along a first fold to form an electrode assembly accommodating unit for accommodating the electrode assembly. The third surface wraps around the electrode assembly accommodating unit at least once. The first fold is parallel to a line along which the first electrode tab and the second electrode tab extend.

18 Claims, 9 Drawing Sheets

U.S. PATENT DOCUMENTS

| | | |
|---|---|---|
| 6,296,967 B1 | 10/2001 | Jacobs et al. |
| 6,461,757 B1 | 10/2002 | Sasayama et al. |
| 6,468,690 B1 | 10/2002 | Barker et al. |
| 6,515,449 B1 | 2/2003 | Thomas et al. |
| 6,676,714 B2 | 1/2004 | Langan |
| 6,902,844 B2 * | 6/2005 | Yageta et al. ............... 429/185 |
| 2001/0033962 A1 | 10/2001 | Suzuki |
| 2002/0022180 A1 * | 2/2002 | Olsen et al. ............... 429/176 |
| 2002/0106555 A1 | 8/2002 | Langan |
| 2003/0082445 A1 | 5/2003 | Smith et al. |
| 2003/0165736 A1 | 9/2003 | Hiratsuka |
| 2004/0029001 A1 | 2/2004 | Yamazaki et al. |
| 2004/0115527 A1 * | 6/2004 | Hiratsuka et al. ........... 429/176 |
| 2004/0149375 A1 | 8/2004 | Huang et al. |
| 2005/0014036 A1 | 1/2005 | Kim |
| 2005/0151514 A1 | 7/2005 | Kozu et al. |
| 2005/0175889 A1 | 8/2005 | Han |
| 2005/0282069 A1 | 12/2005 | Kim et al. |
| 2006/0099503 A1 | 5/2006 | Lee |
| 2006/0214632 A1 | 9/2006 | Lee et al. |

FOREIGN PATENT DOCUMENTS

| | | |
|---|---|---|
| CN | 1411081 A | 4/2003 |
| CN | 1574415 A | 2/2005 |
| EP | 1 107 336 A2 | 6/2001 |
| EP | 1 111 696 A2 | 6/2001 |
| EP | 1 403 942 A1 | 3/2004 |
| EP | 1 473 785 A2 | 11/2004 |
| JP | 2001-176471 | 6/2001 |
| JP | 2002-100326 | 4/2002 |
| JP | 2002-134077 | 5/2002 |
| JP | 2002-298828 | 10/2002 |
| JP | 2003-303580 | 10/2003 |
| JP | 2004-047334 | 2/2004 |
| JP | 2004-087219 | 3/2004 |
| JP | 2005-079080 | 3/2005 |
| KR | 10-0346378 B1 | 7/2002 |
| KR | 10-2003-0067517 | 8/2003 |
| KR | 10-2003-0096718 | 12/2003 |
| KR | 10-2004-0027365 | 4/2004 |
| KR | 10-2005-0022853 | 3/2005 |
| KR | 10-2005-0088007 | 9/2005 |
| WO | WO 03/081695 | 10/2003 |

OTHER PUBLICATIONS

Korean Patent Abstracts, Publication No. 1020040027365 A; Publication Date: Apr. 1, 2004; in the name of Masaru et al.

U.S. Office action dated Dec. 12, 2008, for related U.S. Appl. No. 11/362,559, indicating relevance of listed references in this IDS.

U.S. Office action dated Sep. 16, 2009, for related U.S. Appl. No. 11/374,857, 14 pages.

U.S. Office action dated Feb. 18, 2010, for related U.S. Appl. No. 11/375,351, 16 pages.

U.S. Office action dated Apr. 15, 2010, for related U.S. Appl. No. 11/374,857, 9 pages.

Korean Patent Abstracts, Publication No. 1020050088007, dated Sep. 1, 2005, in the name of Hyung Woo Jeon, 7 pages.

European Search Report dated Sep. 26, 2007, for European Patent application 06120961.5, noting listed references in this IDS.

SIPO Office action dated Jan. 4, 2008, for Chinese Patent application 200610067992.5.

SIPO Office action dated Dec. 28, 2007, for Chinese Patent application 200610071476.X, noting Chinese references listed in this IDS.

Japanese Office action dated Sep. 1, 2009, for Japanese Patent application 2006-061901, noting Japanese references listed in this IDS.

U.S. Office action dated Jul. 22, 2010, for related U.S. Appl. No. 11/375,531, noting U.S. reference listed in this IDS.

English machine translation for Japanese Publication 2004-087219 listed above.

Korean Patent Abstracts, Publication No. 10-2001-0046921, dated Jun. 15, 2001 corresponding to Korean Patent 10-0346378 listed above.

* cited by examiner

POUCH-TYPE LITHIUM SECONDARY BATTERY AND FABRICATING METHOD THEREOF

CROSS-REFERENCE TO RELATED APPLICATIONS

This application claims priority to and the benefit of Korean Patent Application No. 10-2005-0090780 filed on Sep. 28, 2005 in the Korean Intellectual Property Office, the entire content of which is incorporated herein by reference.

BACKGROUND

1. Field of the Invention

The present invention relates to a pouch-type lithium secondary battery and a method of manufacturing the same. More particularly, the invention is directed to a pouch-type lithium secondary battery using a part of the pouch material to perform packing processes, so that an additional packing case is not needed, thereby simplifying the packing processes.

2. Discussion of Related Art

Recently, compact and light electrical and electronic apparatuses such as mobile telephones, notebook computers, and camcorders have been actively developed and produced. Battery packs are built-in to these portable electrical and electronic apparatuses, enabling the apparatuses to operate when other power sources are not available. The built-in battery packs each include at least one battery for outputting a uniform level voltage to drive the portable electrical and electronic apparatus for a desired period of time.

For economical reasons, secondary batteries (which can be charged and discharged) have recently been used as the battery packs. Secondary batteries include lithium secondary batteries such as lithium (Li) batteries and lithium ion (Li-ion) batteries, as well as nickel-cadmium (Ni—Cd) batteries and nickel-hydrogen (Ni-MH) batteries.

In particular, since lithium secondary batteries commonly operate at a voltage of 3.6 V (which is three times greater than the operation voltages of the Ni—Cd batteries and Ni—H batteries that are widely used as power sources for portable electronic apparatuses), and since the energy density per unit weight of lithium ion secondary batteries is high, the use of lithium ion secondary batteries has rapidly increased.

In lithium secondary batteries, lithium-based oxides are used as the positive electrode active materials, and carbon materials are used as the negative electrode active materials. In general, lithium ion secondary batteries are divided into liquid electrolyte batteries and polymer electrolyte batteries according to the kind of electrolyte used. Batteries using liquid electrolytes are referred to as lithium ion batteries, and batteries using polymer electrolytes are referred to as lithium polymer batteries. Also, lithium secondary batteries are manufactured in various shapes, such as cylinders, polygons, and pouches.

In general, in pouch-type lithium secondary batteries, the pouch material is commonly formed of multiple layers of metal foil and a synthetic resin layer which cover the metal foil layers. When pouch-type lithium secondary batteries are used, the weight of the battery (in comparison with cylinder- and polygon-type lithium secondary batteries in which metal cans are used) can be significantly reduced. Therefore, in order to reduce the weight of lithium secondary batteries, pouch-type lithium secondary batteries have been developed.

In general, in pouch-type lithium secondary batteries, an electrode assembly is placed on the bottom surface of the pouch material (which includes a space for accommodating the electrode assembly). The bottom surface is then covered with the top surface of the pouch material and the pouch is sealed to form a pouch bare cell. Accessories, such as protective circuit modules, are attached to the pouch bare cell to form a pouch core pack and the pouch core pack is built-in to an additional battery packing case.

However, when the additional battery packing case of the pouch-type lithium secondary battery is used as described above, processes are complicated, and there are limitations on the improvement of the productivity per unit time of the pouch-type lithium secondary battery. Also, since an additional battery packing case is used, reductions in the manufacturing cost of the pouch-type lithium secondary battery are limited.

SUMMARY OF THE INVENTION

In one embodiment of the present invention, a pouch-type lithium secondary battery is provided in which packing processes are performed using a part of the pouch material without using an additional packing case, thereby simplifying the packing processes.

In another embodiment of the present invention, a method of manufacturing the pouch-type lithium secondary battery is provided.

In one embodiment of the present invention, a pouch-type lithium secondary battery comprises an electrode assembly comprising a first electrode plate to which a first electrode tab is attached, a second electrode plate to which a second electrode tab is attached, a separator positioned between the first electrode plate and the second electrode plate, and a pouch having a pouch material. The pouch material has a first surface, a second surface, and a third surface. The first and second surfaces are adjacent one another, are separated by a preformed fold in the pouch material, and form the electrode assembly accommodating unit (which accommodates the electrode assembly). The third surface is adjacent the second surface and extends from the second surface to wrap around the electrode assembly accommodating unit at least once. The preformed fold separating the first and second surfaces is parallel to the line along which the first and second electrode tabs extend out of the pouch.

The first surface of the pouch material includes a cavity for accommodating the electrode assembly, and the second surface (which is connected to the first surface by the preformed fold) covers the cavity of the first surface. By this structure, the pouch material forms the electrode assembly accommodating unit.

In one embodiment, the pouch-type lithium secondary battery may further include a protective circuit module including an input and output terminal for performing charge and discharge. The input and output terminal may be provided on the outside surface of the protective circuit module. The protective circuit module is electrically connected to the first and second electrode tabs to control charge and discharge and to control erroneous operation of the electrode assembly.

In another embodiment, the pouch-type lithium secondary battery may further include a first molding unit for molding the top of the pouch material so that the input and output terminal on the outside surface of the protective circuit module is exposed.

In another embodiment, the pouch-type lithium secondary battery may further include a second molding unit for protecting the bottom of the pouch material.

One nonlimiting method of forming the first and second molding units is using a hot melt adhesive. The hot melt adhesive may be a thermal fusion adhesive. Nonlimiting examples of suitable thermal fusion adhesives include ethylene-vinyl acetate (EVA) copolymer-based materials, polyamide-based materials, polyester-based materials, rubber-based materials, and polyurethane-based materials.

In one embodiment, the electrode assembly can further include first and second insulating plates on the top and bottom of the electrode assembly.

In one embodiment, the pouch material may include a core, a thermal fusion layer formed on the core, and an insulating layer formed under the core. One nonlimiting example of a suitable material for the core is aluminum (Al). One nonlimiting example of a suitable material for the thermal fusion layer is denatured polypropylene (PP). Nonlimiting examples of suitable materials for the insulating layer include nylon and polyethyleneterephthalate (PET).

In another embodiment of the present invention, a method of manufacturing a pouch-type lithium secondary battery comprises: (a) providing a pouch material, wherein the pouch material has first, second and third surfaces, the first surface having an electrode assembly accommodating space and a gas collecting space; (b) providing an electrode assembly comprising a first electrode plate to which a first electrode tab is attached, a second electrode plate to which a second electrode tab is attached, and a separator positioned between the first electrode plate and the second electrode plate; (c) positioning the electrode assembly in the electrode assembly accommodating space so that the first and second electrode tabs face protrude from the electrode assembly accommodating space in a direction opposite the gas collecting space, (d) folding the second surface of the pouch material along a preformed fold between the first and second surfaces to seal the pouch material and form a pouch bare cell, and (d) wrapping the third surface of the pouch material around the pouch bare cell at least once.

In one embodiment, the preformed fold connecting the first and second surfaces may be parallel to the line along which the first and second electrode tabs extend out of the pouch.

In another embodiment, the method of manufacturing the pouch-type lithium secondary battery may further include electrically connecting a protective circuit module to the first and second electrode tabs on the outer surface of the pouch material. The protective circuit module includes an input and output terminal on its outside surface.

In one embodiment, the method of manufacturing the pouch-type lithium secondary battery may further include forming a first molding unit on the top of the pouch material so that the input and output terminal formed on the outside surface of the protective circuit module is exposed.

In another embodiment, the method of manufacturing the pouch-type lithium secondary battery may further include forming a second molding unit on the bottom of the pouch material using a hot melt adhesive.

In one embodiment, step (d) above includes performing a first thermal fusion process to fold the surfaces of the pouch material. A first through hole is then formed for connecting the electrode assembly accommodating unit and the gas collecting space to the outside. A second through hole is then formed for connecting the electrode assembly to the gas collecting space. An electrolyte is then injected through the first through hole to impregnate the electrode assembly with the electrolyte. A second thermal fusion process is then performed to seal the first through hole. Initial charge and discharge is then performed to collect gas in the gas collecting space. A third thermal fusion process is then performed to seal the second through hole. After performing the third thermal fusion to seal the second through hole, a fourth thermal fusion may be performed to remove the gas collecting space.

BRIEF DESCRIPTION OF THE DRAWINGS

These and/or other aspects and advantages of the present invention will become more apparent by reference to the following detailed description when considered in conjunction with the accompanying drawings, in which.

DETAILED DESCRIPTION

Figure 1A:
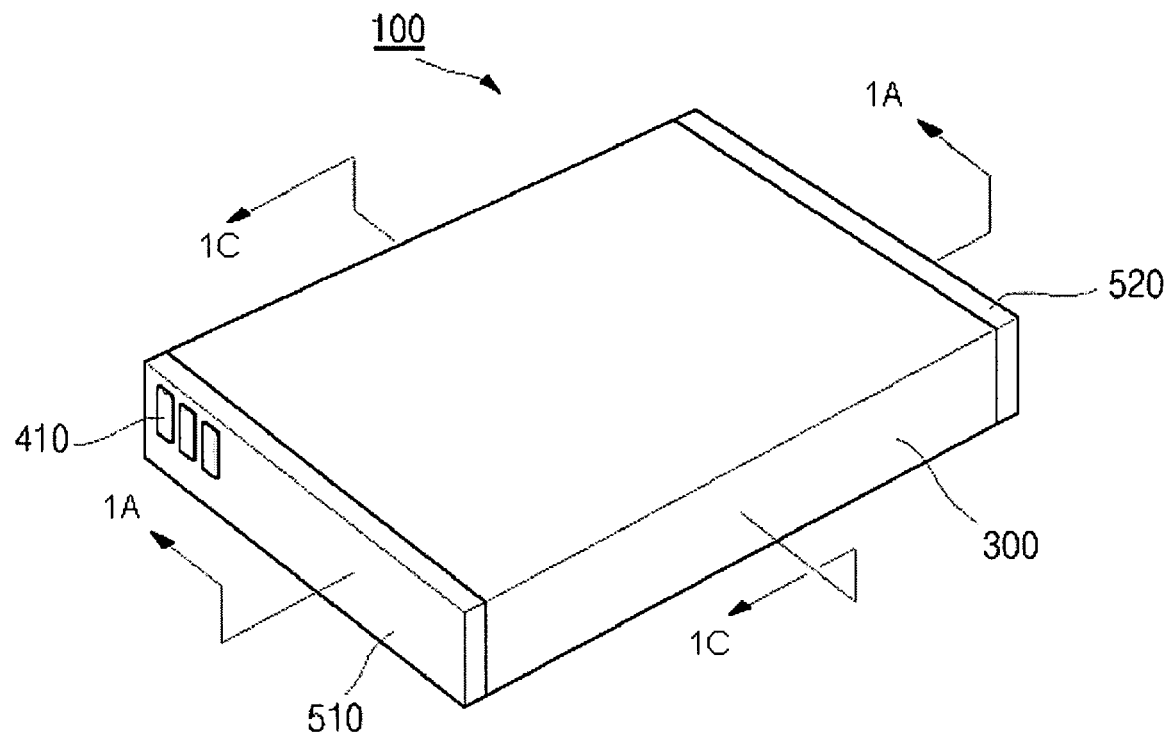
FIG. 1A is a perspective view of a pouch-type lithium secondary battery according to one embodiment of the present invention.

Hereinafter, exemplary embodiments of the present invention will be described in detail with reference to the accompanying drawings. In the drawings, like reference numerals refer to like elements.

Figure 1B:
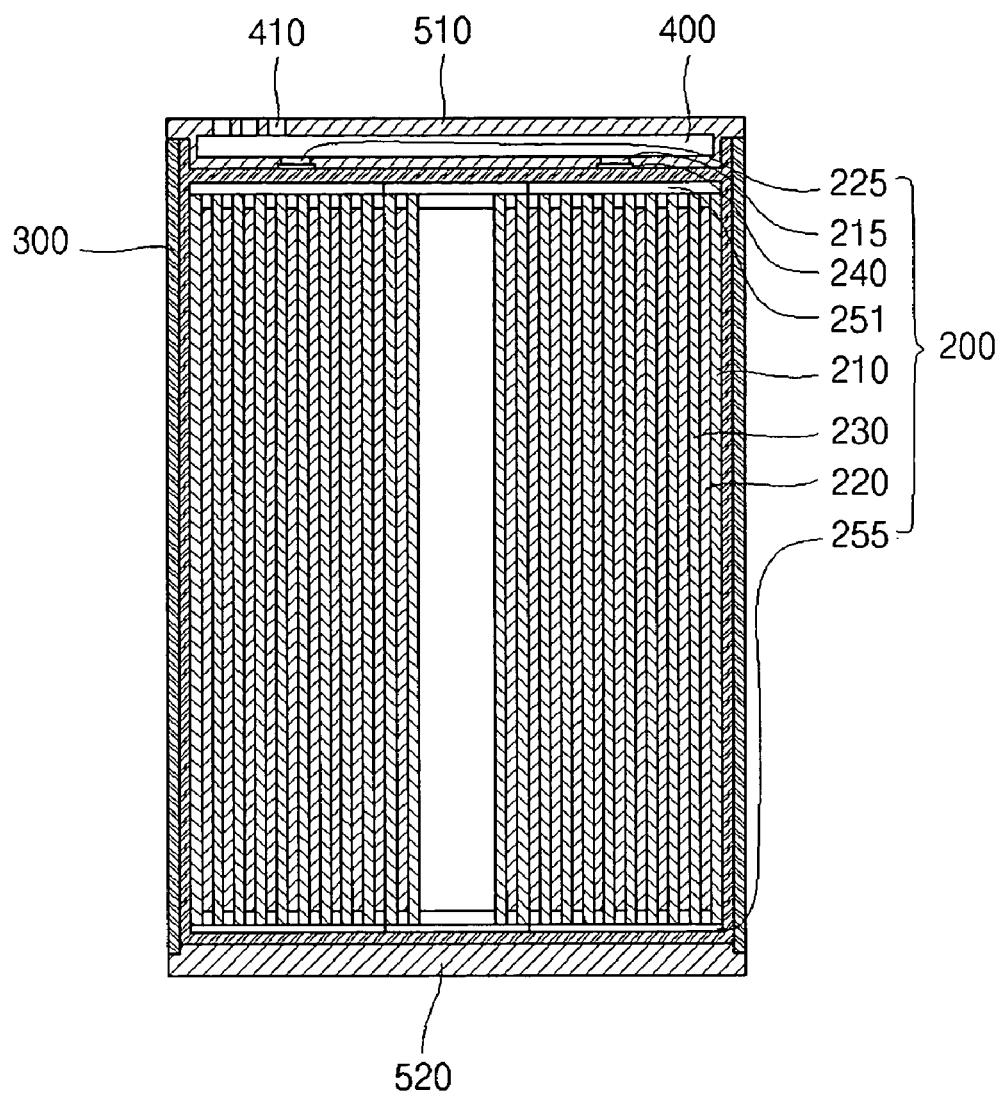
FIG. 1B is a cross-sectional view of the battery of FIG. 1A, taken along line 1A-1A.
Figure 1C:
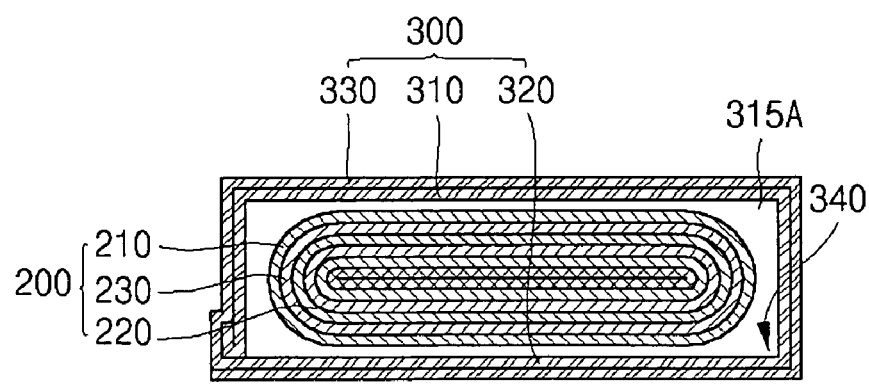
FIG. 1C is a cross-sectional view of the battery of FIG. 1A, taken along line 1C-1C of FIG. 1A.

FIG. 1A is a perspective view of a pouch-type lithium secondary battery according to one embodiment of the present invention. FIG. 1B is a cross-sectional view of the battery of FIG. 1A taken along line 1A-1A. FIG. 1C is a cross-sectional view of the battery of FIG. 1A taken along line 1C-1C.

Referring to FIGS. 1A through 1C, a pouch-type lithium secondary battery 100 according to one embodiment of the present invention includes an electrode assembly 200, a pouch material 300 for accommodating the electrode assembly 200, a protective circuit module 400 for controlling the charge and discharge of the electrode assembly 200, and first and second molding units 510 and 520 formed by hot melting.

The electrode assembly 200 includes a first electrode plate 210 coated with a positive electrode active material, a second electrode plate 220 coated with a negative electrode active material, and a separator 230 positioned between the first electrode plate 210 and the second electrode plate 220 for preventing short circuits between the first electrode plate 210 and the second electrode plate 220 and to allow only lithium ions to move. A first electrode tab 215 operating as a positive electrode tab (commonly formed of aluminum (Al) though not limited thereto) is connected to the first electrode plate and protrudes from the first electrode plate by a desired length. A second electrode tab 225 operating as a negative electrode tab (commonly formed of nickel (Ni) though not limited thereto) is connected to the second electrode plate and protrudes from the second electrode plate 220 by a desired length. An insulating tape 240 for preventing the first electrode tab 215, the second electrode tab 225, and the pouch material 300 from short circuiting can be further provided. The first electrode tab 215 and the second electrode tab 225 extend outside the pouch through one side of the pouch material 300 and are electrically connected to the protective circuit module 400. If desired, first and second insulating plates 251 and 255 can be attached to the top and bottom of the electrode assembly 200 to prevent the electrode assembly 200 from being directly connected to the pouch material 300.

Nonlimiting examples of suitable materials for the positive electrode active material include chalcogenide compounds, for example, composite metal oxides such as $LiCoO_2$, $LiMn_2O_4$, $LiNiO_2$, $LiNi1-xCoxO_2(0<x<1)$, and $LiMnO_2$. Nonlimiting examples of suitable negative electrode active materials include carbon (C) based materials, Si, Sn, tin oxides, composite tin alloys, transition metal oxides, lithium metal nitrides, or lithium metal oxides. One nonlimiting example of a suitable material for the positive electrode plate is Aluminum (Al). One nonlimiting example of a suitable material for the negative electrode plate is copper (Cu). Nonlimiting examples of suitable materials for the separator include polyethylene (PE) and polypropylene (PP).

According to one embodiment of the present invention, the first electrode tab 215 and the second electrode tab 225 of the pouch-type lithium secondary battery 100 extend upward.

In one embodiment of the present invention, the pouch material 300 has a first surface 310, a second surface 320, and a third surface 330.

The first surface 310 includes a cavity for accommodating the electrode assembly 200 and is open in one direction. The second surface 320 is connected to the first surface 310 by a preformed fold 340. The second surface 320 covers the open part of the first surface 310.

In one embodiment, the preformed fold 340 is parallel to a line along which the first electrode tab 215 and the second electrode tab 225 extend from the electrode assembly 200. That is, the preformed fold 340 may be positioned on the side of the electrode assembly 200.

In one embodiment, the third surface 330 is long enough to wrap around the first and second surfaces 310 and 320, respectively, defining the electrode assembly accommodating unit at least once. That is, the pouch material 300 is generally tube-shaped so that two adjacent surfaces (i.e. the first and second surfaces 310 and 320 respectively) are folded by the preformed fold 340 to form an electrode assembly accommodating unit 315A for accommodating the electrode assembly 200 and so that the other surface (i.e. the third surface 330) surrounds the electrode assembly accommodating unit 315A at least once. That is, the third surface 330 functions as a wing for surrounding the electrode assembly accommodating unit 315A.

The pouch material 300 includes a core, a thermal fusion layer formed on top of the core, and an insulating layer formed on the bottom of the core. One nonlimiting example of a suitable material for the core is aluminum (Al). One nonlimiting example of a suitable material for the thermal fusion layer is denatured polypropylene (PP) (i.e. a polymer resin such as casted polypropylene (CPP) for functioning as an adhesive layer). Nonlimiting examples of suitable materials for the insulating layer include resins such as nylon and polyethyleneterephthalate (PET).

The protective circuit module 400 positioned on the pouch material 300 is electrically connected to the first electrode tab 215 and the second electrode tab 225 of the electrode assembly 200 to control charge and discharge and to control erroneous operation of the electrode assembly 200. For example, when over-current flows from the electrode assembly 200, the protective circuit module 400 intercepts the over-current. The protective circuit module 400 includes an input and output terminal 410 on its outside surface for the charge and discharge of the pouch-type lithium secondary battery 100. Although not shown in the drawings, the protective circuit module 400 may include a variety of common protective circuits.

In one embodiment, the first and second molding units 510 and 520 are molded by a hot-melting method using a hot melt adhesive. The first and second molding units 510 and 520 help the pouch material 300 remain generally tube-shaped.

In one embodiment, a thermal fusion adhesive in which a non-volatile, incombustible, and thermoplastic resin that is 100% solid at room temperature is used as the hot melt adhesive for the first and second molding units 510 and 512. When such a thermal fusion adhesive is used, water (or other solvent) need not be used. The thermal fusion adhesive is liquefied at high temperature and then applied to the object to be adhered. The thermal fusion adhesive acquires adhesive force after compression, cooling and solidification, which occurs within a few seconds.

Nonlimiting examples of suitable hot melts for the first and second molding units 510 and 520 include ethylene-vinyl acetate (EVA) copolymer-based materials, polyamide-based materials, polyester-based materials, rubber-based materials, and polyurethane-based materials.

The first molding unit 510 is formed by molding the portion of the protective circuit module 400 settled on the pouch material 300 using the hot melt so that the input and output terminal 410 of the protective circuit module 400 is exposed. That is, the first molding unit 510 covers the outside of the protective circuit module on the pouch material 300 but leaves the input and output terminal 410 exposed.

The packing processes are performed using the pouch material 300 in the inventive pouch-type lithium secondary battery 100. This leaves the bottom of the pouch-type lithium secondary battery 100 vulnerable to external shock (when compared to other parts of the battery). Accordingly, a second molding unit 520 is molded by hot melting to the bottom of the pouch.

Figure 2:
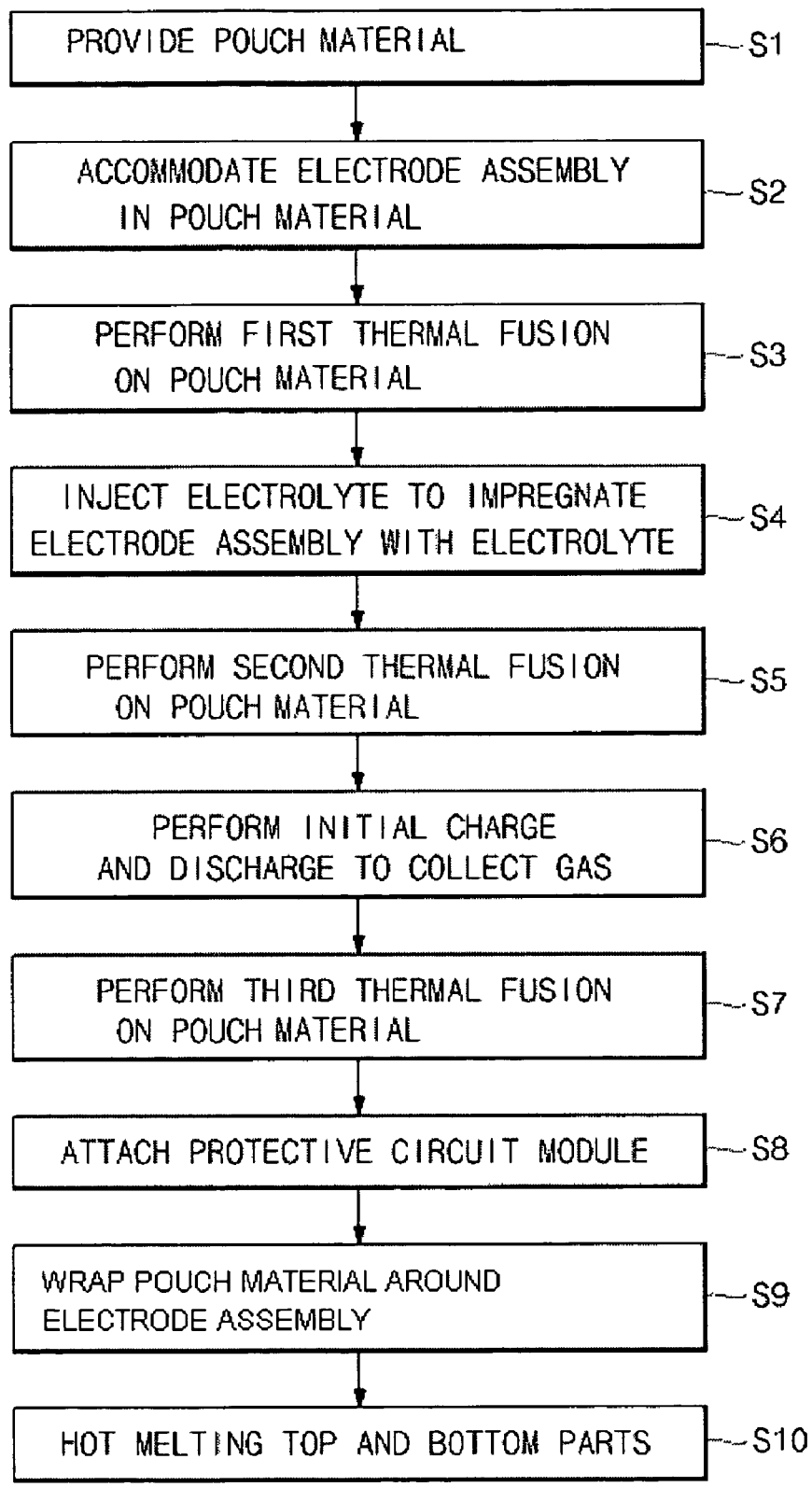
FIG. 2 is a flowchart illustrating a method of manufacturing a pouch-type lithium secondary battery according to one embodiment of the present invention.

FIG. 2 is a flowchart illustrating a method of manufacturing a pouch-type lithium secondary battery according to one embodiment of the present invention. Referring to FIG. 2, one method of manufacturing a pouch-type lithium secondary battery according to an embodiment of the present invention includes first providing a pouch material (step S1). The method further includes accommodating an electrode assembly in an electrode assembly accommodating cavity of the pouch material (step S3). In addition, the method includes performing a first thermal fusion process on the pouch material (step S3). The method further includes injecting an electrolyte into the pouch to impregnate the electrode assembly with the electrolyte (step S4). Also, the method further includes performing a second thermal fusion process on the pouch material (step S5). The method further includes performing initial charge and discharge to collect gas (step S6). In addition, the method includes performing a third thermal fusion process on the pouch material (step S7). The method further includes attaching a protective circuit module (step S8). Also, the method further includes wrapping the pouch material around the electrode assembly (step S9). Finally, the method includes hot-melting the pouch material, thereby manufacturing a pouch-type lithium secondary battery according to one embodiment of the present invention (step S10).

Figure 3A:
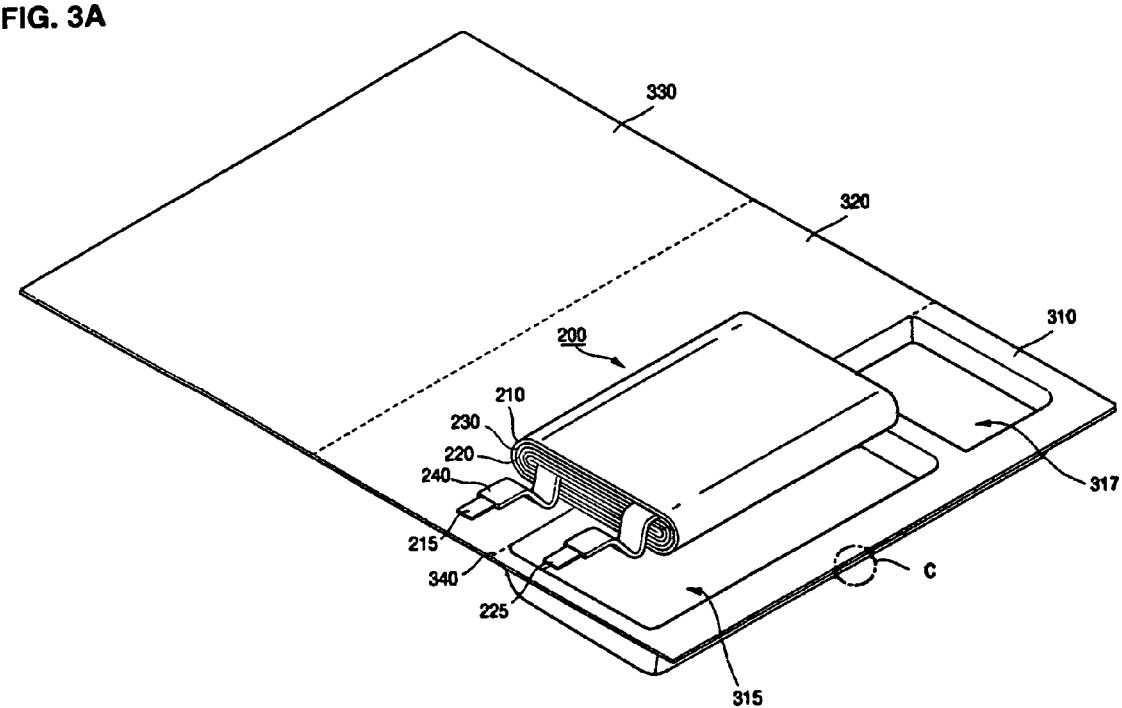
FIG. 3A is a schematic depicting a step in a method of manufacturing a pouch-type lithium battery according to one embodiment of the present invention.
Figure 3B:
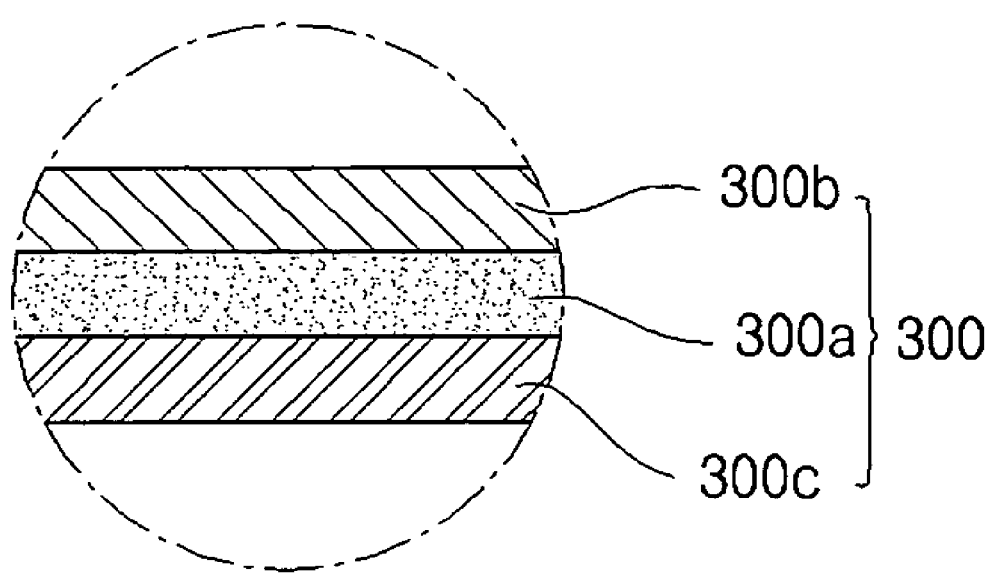
FIG. 3B is an exploded view of area 3B in FIG. 3A.

FIGS. 3A to 3F illustrate a method of manufacturing a pouch-type lithium secondary battery according to one embodiment of the present invention. FIG. 3B is an enlarged sectional view of area 3B in FIG. 3A. Hereinafter, a method of manufacturing the pouch-type lithium secondary battery according to one embodiment of the present invention will be described with reference to FIGS. 2 and 3A through 3F.

First, in step S1 a pouch material is provided as illustrated in FIG. 3A. As shown, the pouch material 300 includes a first surface 310, a second surface 320, and a third surface 330 connected to each other by preformed folds 341 and 345.

The first surface 310 includes a cavity 315 for receiving an electrode assembly 200, and a gas collecting space 317. The second surface 320 is connected to the first surface and covers the first surface 310 to form an electrode assembly accommodating unit 315A. The third surface 330 is long enough to wrap around the electrode assembly accommodating unit 315A at least once.

In one embodiment, the line along which the cavity 315 and the gas collecting space 317 extend may be parallel to the preformed folds 341 and 345.

In one embodiment, the pouch material 300 includes a core 300a formed of a metal such as aluminum (Al), a thermal fusion layer 300b formed on the top surface of the core, and an insulating layer 300c formed on the bottom surface of the core 300a. One nonlimiting example of a suitable material for the core 300a is aluminum (Al). One nonlimiting example of a suitable material for the thermal fusion layer 300b is a denatured polypropylene (PP) (i.e. a polymer resin such as casted polypropylene (CPP) to function as the adhesive layer). Nonlimiting examples of suitable materials for the insulating layer 300c include resins such as nylon or polyethyleneterephthalate (PET).

The cavity 315 for accommodating the electrode assembly 200 and the gas collecting space 317 are formed in the first surface 310. However, the cavity 315 and the gas collecting space 317 can alternatively be formed in either the second surface 320 or the third surface 330.

In step S2 (accommodating the electrode assembly in the pouch material), as illustrated in FIGS. 3A and 3B, the electrode assembly 200 is provided and accommodated in the cavity 315 of the first surface 310 of the pouch material 300. The first electrode tab 215 and the second electrode tab 225 of the electrode assembly 200 protrude from the pouch by a desired length and in the direction opposite the gas collecting space 317. For purposes of this description, it is assumed that the first electrode tab 215 and the second electrode tab 225 protrude upward relative to the pouch-type lithium secondary battery.

The order in which the electrode assembly 200 and the pouch material 300 are provided is not limited to the above, and the electrode assembly 200 can be provided first, followed by providing the pouch material 300.

In one embodiment, first and second insulating plates 251 and 255 can be attached to the top and bottom of the electrode assembly 200 to prevent the electrode assembly 200 from being directly connected to the pouch material 300.

Figure 3C:
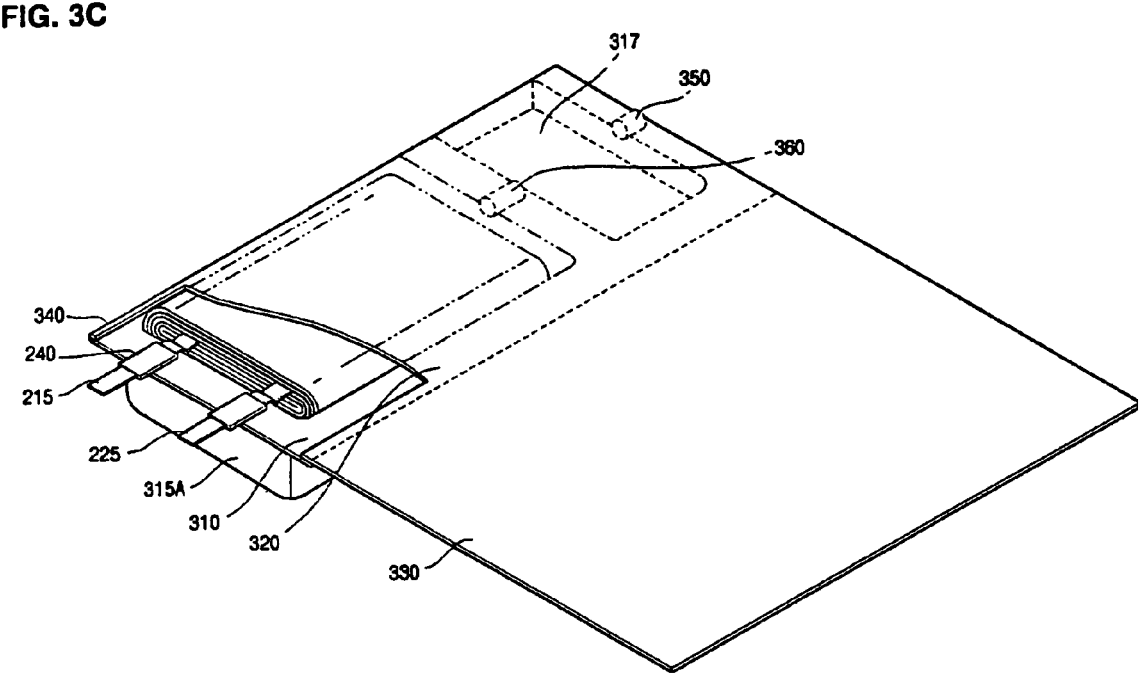
FIG. 3C is a schematic illustrating another step in the method of manufacturing a pouch-type lithium battery illustrated in FIG. 3A.

In step S3 (performing the first thermal fusion process on the pouch material), as illustrated in FIG. 3C, after accommodating the electrode assembly 200 in the cavity 315, the pouch material 300 is folded along the preformed fold 340 so that the first surface 310 is covered with the second surface 320. The first thermal fusion process is then performed to connect the first and second surfaces 310 and 320 together.

The preformed fold 340 may be parallel to the line along which the first and second electrode tabs 215 and 225 of the electrode assembly 200 extend. That is, the preformed fold 340 may be positioned on the side of the electrode assembly 200.

The first thermal fusion process is performed on the pouch material 300 at the edge of the cavity 315 to form the gas collecting space 317 next to the cavity 315.

A first through hole 350 is created at the edge of the gas collecting space 317. The first through hole 350 connects the gas collecting space 317 to the outside of the pouch material 300. A second through hole 360 is created between the cavity 315 and the gas collecting space 317. The second through hole 360 connects the cavity 315 and the gas collecting space 317.

After accommodating the electrode assembly 200 in the cavity 315, the first thermal fusion process is performed to connect the first surface 310 and the second surface 320 of the pouch material to each other so that the cavity 315 operates as the electrode assembly accommodating unit 315A.

In step S4 (injecting the electrolyte to impregnate the electrode assembly with the electrolyte) the pouch is positioned such that the gas collecting space 317 is at the top and the electrolyte is injected through the first through hole 350 under vacuum so that the electrode assembly 200 is impregnated with the electrolyte.

Since the first through hole 350 into which the electrolyte is injected is parallel to the line along which the first and second electrode tabs 215 and 225 of the electrode assembly 200 extend, few obstacles exist through which the electrolyte must pass before impregnating the electrode assembly 200. This enables effective impregnation of the electrode assembly 200 with the electrolyte. That is, the electrolyte can effectively penetrate the gaps between the first electrode plate 210, the second electrode plate 220 and the separator 230 of the electrode assembly 200.

Figure 3D:
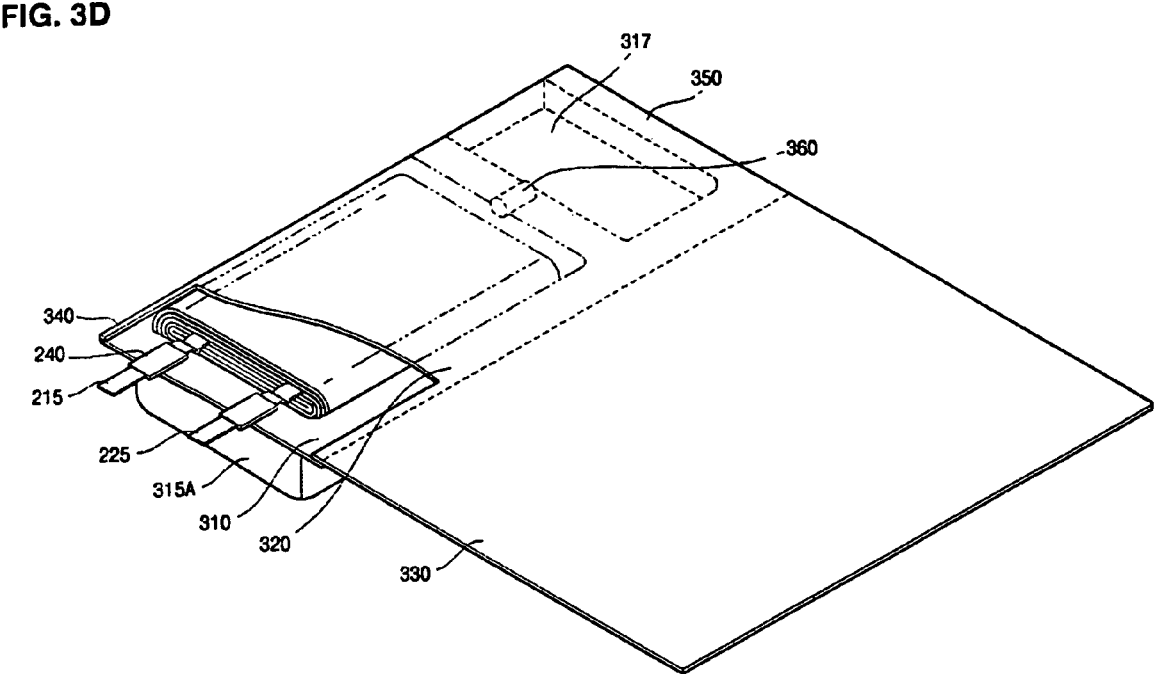
FIG. 3D is a schematic illustrating yet another step in the method of manufacturing a pouch-type lithium battery illustrated in FIG. 3A.

In step S5 (performing the second thermal fusion process on the pouch material), as illustrated in FIG. 3D, after injecting the electrolyte and impregnating the electrode assembly 200 with the electrolyte, the second thermal fusion process is performed to seal the first through hole 350 of the pouch material 300.

In step S6 (performing initial charge and discharge to collect gas), as illustrated in FIG. 3D, after performing the second thermal fusion process on the first through hole 350, initial charge and discharge is performed with the gas collecting space 317 positioned at the top of the pouch. During initial charge and discharge, a gas is generated by the electrode assembly 200. This gas is collected in the gas collecting space 317 through the second through hole 360.

Since the gas collecting space 317 is positioned opposite the direction in which the first and second electrode tabs 215 and 225 extend, there exist few obstacles to the movement of the gas. Therefore, effective degassing can be performed.

Figure 3E:
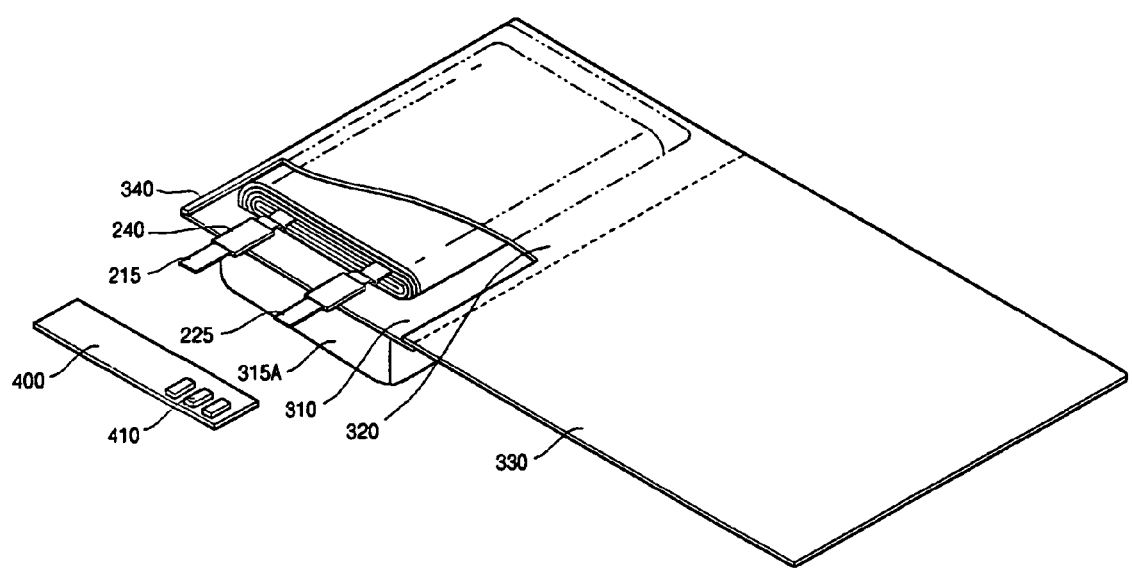
FIG. 3E is a schematic illustrating still another step in the method of manufacturing a pouch-type lithium battery illustrated in FIG. 3A.

In step S7 (performing the third thermal fusion process on the pouch material), as illustrated in FIG. 3E, after performing initial charge and discharge and collecting the gas in the gas collecting space 317, the third thermal fusion process is performed to seal the second through hole 360.

Then, the gas collecting space 317 is cut away from the electrode assembly accommodating unit 315a to form a pouch bare cell.

In step S8 (attaching the protective circuit module), after performing the third thermal fusion process and removing the gas collecting space 317, the protective circuit module 400 is electrically attached to the first and second electrode tabs 215 and 225 which protrude above the pouch bare cell.

The protective circuit module 400 may include a variety of protective circuits to control the charge and discharge and to control the erroneous operation of the electrode assembly 200. The protective circuit module 400 includes an input and output terminal 410 for charge and discharge of the electrode assembly 200.

In step S9 (wrapping the pouch material around the electrode assembly), after attaching the protective circuit module 400, the third surface 330 of the pouch material 300 is wrapped around the outer circumference of the pouch bare cell at least once.

That is, the outer circumference of the electrode assembly accommodating unit 315A (which includes an electrode assembly within the cavity in the first surface of the pouch material covered by the second surface of the pouch material) is surrounded at least once by the third surface 330 of the pouch material 300.

The order of step S8 (attaching the protective circuit module) and step S9 (wrapping the pouch material around the electrode assembly) is not limited to the above. In one embodiment, step S8 (attaching the protective circuit module) can be performed after step S9 (wrapping the pouch material around the electrode assembly).

Figure 3F:
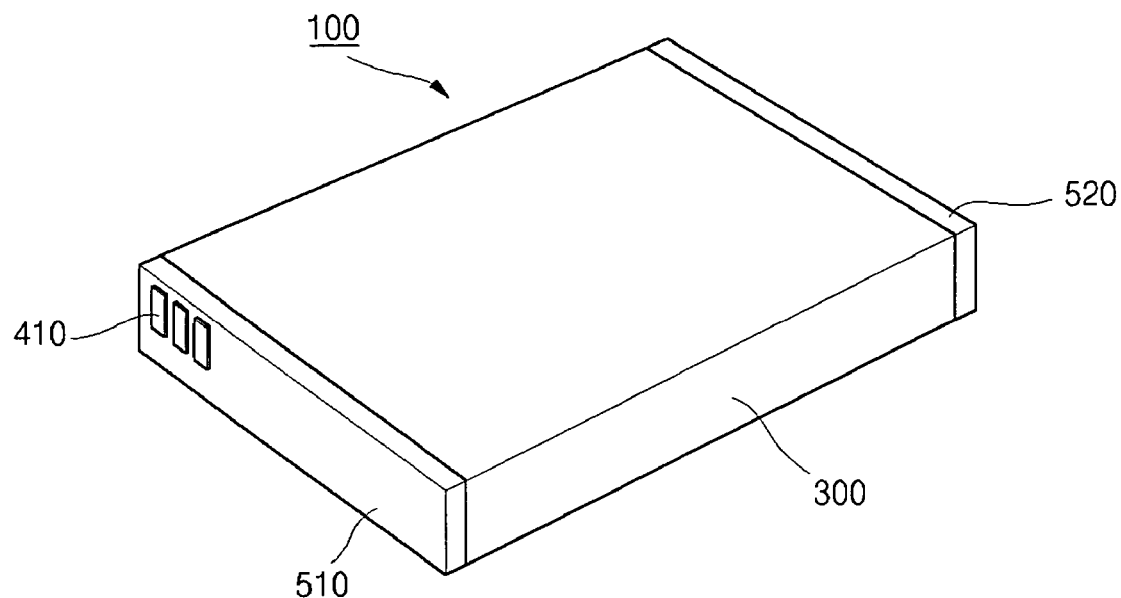
FIG. 3F is a perspective view of a pouch-type lithium battery manufactured by the process depicted in FIGS. 3A through 3E.

In step S10 (hot-melting the pouch material to complete the pouch-type lithium battery), as illustrated in FIG. 3F, after the pouch bare cell is surrounded at least once by the third surface 330 of the pouch material 300, the top (where the protective circuit module 400 of the pouch bare cell is attached) and the bottom of the pouch bare cell are hot-melted with a hot melt adhesive to form the first and second molding units 510 and 520 and thereby complete the pouch-type lithium secondary battery 100.

In one embodiment, the input and output terminal 410 of the protective circuit module 400 may be hot-melted so as not to be exposed to the outside.

In one embodiment, the top and bottom of the pouch material 300 are hot melted to preserve the form in which the pouch material is wrapped around the electrode assembly.

In the above-described inventive pouch-type lithium secondary batteries, additional packing cases are not used. Rather, a part of the pouch material 300 itself surrounds the electrode assembly accommodating unit 315A so that the packing processes are performed by simply wrapping the pouch material around the electrode assembly accommodating unit 315A, thereby simplifying the packing processes.

Since additional packing cases are not used, manufacturing costs of the inventive pouch-type lithium secondary batteries are reduced.

In the process of injecting the electrolyte to impregnate the electrode assembly 200 with the electrolyte, the electrolyte is injected in a direction parallel to the direction in which the first and second electrode tabs 215 and 225 of the electrode assembly 200 extends. This makes it possible to effectively impregnate the electrode assembly 200 with the electrolyte. That is, the electrolyte can effectively penetrate the gaps between the first electrode plate 210, the second electrode plate 220 and the separator 230 of the electrode assembly 200.

The gas collecting space 317 is positioned on the side opposite the direction in which the first and second electrode tabs 215 and 225 extend. Therefore, during initial charge and discharge to collect the gas, there are few obstacles to the movement of the gas, making it possible to effectively perform degassing.

As described above, in the inventive batteries, since the packing processes are performed using a part of the pouch material without using additional packing cases, the packing processes of the inventive pouch-type lithium batteries are simplified, as is a method of manufacturing the same.

Although certain exemplary embodiments of the present invention have been shown and described, it will be appreciated by those skilled in the art that changes may be made to the described embodiments without departing from the principle, spirit and scope of the invention, as defined in the appended claims.

What is claimed is:

1. A pouch-type lithium secondary battery comprising:
   an electrode assembly comprising:
      a first electrode plate and a first electrode tab attached to the first electrode plate, the first electrode tab having a first longitudinal axis and extending from the first electrode plate in a direction defined by the first longitudinal axis,
      a second electrode plate and a second electrode tab attached to the second electrode plate, the second electrode tab having a second longitudinal axis substantially parallel to the first longitudinal axis of the first electrode tab and extending from the second electrode plate in a direction defined by the second longitudinal axis, and
      a separator between the first electrode plate and the second electrode plate; and
   a pouch material comprising a first surface, a second surface, and a third surface, wherein the first surface and the second surface of the pouch material are folded together along a first fold to form an electrode assembly accommodating unit for accommodating the electrode assembly, and wherein the third surface of the pouch material wraps entirely around the electrode assembly accommodating unit at least once, the first fold extending in a direction substantially parallel to the direction in which the first electrode tab and the second electrode tab extend from the electrode assembly.

2. The pouch-type lithium secondary battery as claimed in claim 1, wherein the electrode assembly accommodating unit comprises a cavity in the first surface of the pouch material for accommodating the electrode assembly, and wherein the second surface of the pouch material covers the cavity in the first surface.

3. The pouch-type lithium secondary battery as claimed in claim 1, further comprising a protective circuit module comprising an input and an output terminal, the protective circuit module being electrically connected to the first electrode tab and second electrode tab, wherein the protective circuit module is adapted to control charge, discharge and erroneous operation of the electrode assembly.

4. The pouch-type lithium secondary battery as claimed in claim 3, further comprising a first molding unit positioned on the pouch material covering the protective circuit module, wherein the input and output terminal of the protective circuit module are exposed.

5. The pouch-type lithium secondary battery as claimed in claim 4, further comprising a second molding unit positioned on a side of the pouch material opposite a side where the first and second electrode tabs are positioned.

6. The pouch-type lithium secondary battery as claimed in claim 4, wherein the first molding unit is formed using a hot melt adhesive.

7. The pouch-type lithium secondary battery as claimed in claim 5, wherein the second molding unit is formed using a hot melt adhesive.

8. The pouch-type lithium secondary battery as claimed in claim 7, wherein the hot melt adhesive comprises a thermal fusion adhesive.

9. The pouch-type lithium secondary battery as claimed in claim 8, wherein the hot melt adhesive is selected from the group consisting of ethylene-vinyl acetate (EVA) copolymer-based materials, polyamide-based materials, polyester-based materials, rubber-based materials, and polyurethane-based materials.

10. The pouch-type lithium secondary battery as claimed in claim 1, wherein the electrode assembly further comprises a first insulating plate and a second insulating plate on a top part and a bottom part of the electrode assembly, respectively.

11. The pouch-type lithium secondary battery as claimed in claim 1, wherein the pouch material comprises:
   a core;
   a thermal fusion layer adjacent the core; and
   an insulating layer adjacent the core.

12. The pouch-type lithium secondary battery as claimed in claim 11, wherein the core comprises aluminum (Al), the thermal fusion layer comprises denatured polypropylene (PP), and the insulating layer comprises a material selected from the group consisting of nylon and polyethyleneterephthalate (PET).

13. A method of manufacturing a pouch-type lithium secondary battery, the secondary battery comprising a pouch material comprising a first surface, a second surface, and a third surface, wherein the first surface comprises a cavity for accommodating an electrode assembly and a gas collecting space and an electrode assembly comprising a first electrode plate, a first electrode tab attached to the first electrode plate, the first electrode tab having a first longitudinal axis and extending from the first electrode plate in a direction defined by the first longitudinal axis, a second electrode plate, a second electrode tab attached to the second electrode plate, the second electrode tab having a second longitudinal axis substantially parallel to the first longitudinal axis of the first electrode tab and extending from the second electrode plate in a direction defined by the second longitudinal axis, and a separator between the first electrode plate and the second electrode plate, the method comprising:
   accommodating the electrode assembly in the cavity in the first surface of the pouch material so that the first electrode tab and the second electrode tab extend in a direction generally away from the gas collecting space;
   folding the second surface of the pouch material along a first fold between the first surface and the second surface to cover the cavity and gas collecting space and thereby form a pouch bare cell, wherein the first fold extends in a direction substantially parallel to the direction in which the first electrode tab and the second electrode tab extend from the electrode assembly; and
   wrapping the third surface of the pouch material entirely around the pouch bare cell at least once.

14. The method of manufacturing the pouch-type lithium secondary battery as claimed in claim 13, further comprising electrically connecting a protective circuit module to the first electrode tab and to the second electrode tab, wherein the protective circuit module comprises an input terminal and an output terminal.

15. The method of manufacturing the pouch-type lithium secondary battery as claimed in claim 14, further comprising forming a first molding unit on a side of the pouch material where the protective circuit module is connected, wherein the first molding unit is formed so that the input terminal and the output terminal of the protective circuit module are exposed.

16. The method of manufacturing the pouch-type lithium secondary battery as claimed in 15, further comprising forming a second molding unit on a side of the pouch material opposite the position of the first molding unit, wherein the second molding unit is formed using a hot melt adhesive.

17. The method of manufacturing the pouch-type lithium secondary battery as claimed in claim 13, wherein folding the second surface of the pouch material comprises:
   folding the second surface of the pouch material along the first fold to cover the cavity and gas collecting space in the first surface of the pouch material;
   performing a first thermal fusion process to connect the first surface and the second surface of the pouch material;
   forming a first through hole connecting the gas collecting space to an exterior of the pouch material;
   forming a second through hole connecting the electrode assembly to the gas collecting space;
   injecting an electrolyte through the first through hole to impregnate the electrode assembly with the electrolyte;
   performing a second thermal fusion process to seal the first through hole;
   performing an initial charge and discharge to collect a gas in the gas collecting space; and
   performing a third thermal fusion process to seal the second through hole.

18. The method of manufacturing a pouch-type lithium secondary battery as claimed in claim 17, further comprising removing the gas collecting space.

* * * * *

UNITED STATES PATENT AND TRADEMARK OFFICE
CERTIFICATE OF CORRECTION

PATENT NO.         : 7,976,981 B2                                             Page 1 of 1
APPLICATION NO.    : 11/540855
DATED              : July 12, 2011
INVENTOR(S)        : Hyungbok Lee It is certified that error appears in the above-identified patent and that said Letters Patent is hereby corrected as shown below:

In the Claims

Column 10, Claim 3, line 43          After "input"
                                      Insert -- terminal --

Column 10, Claim 3, line 45          Before "second"
                                      Insert -- to the --

Column 10, Claim 4, line 49          Delete "positioned"

Column 10, Claim 4, line 51          Delete "input and output"
                                      Insert
                                      -- input terminal and the output --

Column 10, Claim 5, line 54          Delete "positioned"

Column 10, Claim 5, lines 55-56      Delete "first and second"
                                      Insert
                                      -- first electrode tab and the second --

Column 10, Claim 5, line 56          Delete "tabs"
                                      Insert -- tab --

Column 10, Claim 6, line 58          Delete "is formed using"
                                      Insert
                                      -- comprises --

Column 10, Claim 7, line 61          Delete "is formed using"
                                      Insert
                                      -- comprises --

Signed and Sealed this
Twentieth Day of March, 2012

David J. Kappos
*Director of the United States Patent and Trademark Office*